United States Patent [19]

Large et al.

[11] 4,367,514

[45] Jan. 4, 1983

[54] RECESSED LIGHTING SYSTEM

[75] Inventors: David T. Large, Everett; Gary E. King, Snohomish, both of Wash.

[73] Assignee: The Boeing Company, Seattle, Wash.

[21] Appl. No.: 192,338

[22] Filed: Sep. 29, 1980

[51] Int. Cl.³ .................. B64D 47/04; F21V 13/08; F21V 29/00; F21V 7/02

[52] U.S. Cl. ............................ 362/62; 362/268; 362/293; 362/294; 362/297; 362/307; 362/346

[58] Field of Search ............... 362/62, 268, 293, 294, 362/297, 307, 346

[56] References Cited

U.S. PATENT DOCUMENTS

| | | | |
|---|---|---|---|
| 1,619,100 | 3/1927 | Brush | 362/62 |
| 1,724,482 | 8/1929 | Hicks | 362/62 |
| 1,799,285 | 4/1931 | Dake | 362/62 |
| 1,799,286 | 4/1931 | Dake | 362/62 |
| 1,845,153 | 2/1932 | Hyatt | 362/62 |
| 1,934,379 | 2/1934 | Ziesing | 362/62 |
| 1,934,609 | 1/1934 | Hyatt | 362/62 |
| 1,996,126 | 2/1935 | Sipp | 362/62 |
| 2,241,128 | 5/1941 | Harley | 362/62 |
| 2,257,127 | 9/1941 | Roper | 362/62 |
| 3,255,343 | 6/1966 | Kloss | 362/62 |
| 4,161,770 | 7/1979 | Maurer | 362/62 |
| 4,206,494 | 6/1980 | Loueving | 362/268 |

Primary Examiner—Irwin Gluck
Attorney, Agent, or Firm—Christensen, O'Connor, Johnson & Kindness

[57] ABSTRACT

A recessed lighting system for a vechicle such as an airplane employs an exit lens mounted in the external skin of the airplane that has minimum cross-sectional area. The lighting system can include a light source such as a conventional lamp, a light converging lens to reduce the cross-sectional area of the lamp beam, a focusing lens to adjust the exit beam dispersal, and a mirror to divert the converged light beam through the exit lens.

14 Claims, 2 Drawing Figures

RECESSED LIGHTING SYSTEM

BACKGROUND OF THE INVENTION

This invention relates to lighting systems, and more specifically, to recessed lighting systems that are particularly suitable for aircraft.

As used herein, a recessed lighting system is one wherein the light source is spaced internally from the skin or outer surface panel of an airplane or other craft in which it is being employed. Landing light systems for aircraft, for example, are mostly of the recessed type. In large commercial aircraft, landing light systems are installed in the aerodynamic fairing positioned between the leading edge of the wing and the body of the aircraft. The light source is positioned rearwardly from the forward surface of the fairing and exits from the fairing through a window. Since conventional lamps produce a diverging light beam, the exit window is be necessity larger than the lamp itself. Because of the forward sweep of the wing fairing, an elongated exit window many times bigger than the size of the original light beam emanating from the light source is required so that all of the light emanating from the source can pass through the fairing and be usable to illuminate the runway or taxi strip.

Accordingly, it is a broad object of the present invention to provide an improved recessed lighting system, to provide a recessed lighting system that employs an exit window of smaller cross-sectional area than prior windows, to provide a recessed lighting system that is more versatile than prior systems, to provide a recessed lighting system that can be employed to scan a predetermined area to be illuminated, to provide a recessed lighting system that can be positioned where prior systems cannot be located, to provide a recessed lighting system that can dispose of heat energy produced by the light source, to provide a recessed lighting system that is easily accessible and serviceable, and lastly, to provide a lighter weight and more economical recessed lighting system.

SUMMARY OF THE INVENTION

In accordance with the foregoing objects, and other objects that will become apparent to one of ordinary skill upon reading the following specification, the present invention provides a recessed lighting system for use, for example, on an airplane having an exterior skin. The lighting system includes a lamp means for producing a light beam, means operatively associated with the lamp means for causing the light beam to converge at a location adjacent the skin, and exit lens means that is transparent to the light beam mounted in the skin. Both the lamp means and the means for causing the light beam to converge are located internally of and generally spaced from the inner surface of the skin. The lens means is positioned so as to intersect the path of the light beam and allow the beam to travel externally of the skin as an exit illumination beam. Preferably, a mirror means for reflecting the light beam is also located internally of the skin. The mirror means and/or lens means and the lamp means, are so positioned relative to each other as to bend the light beam emanating from the lamp means and cause it to pass through the lens means.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
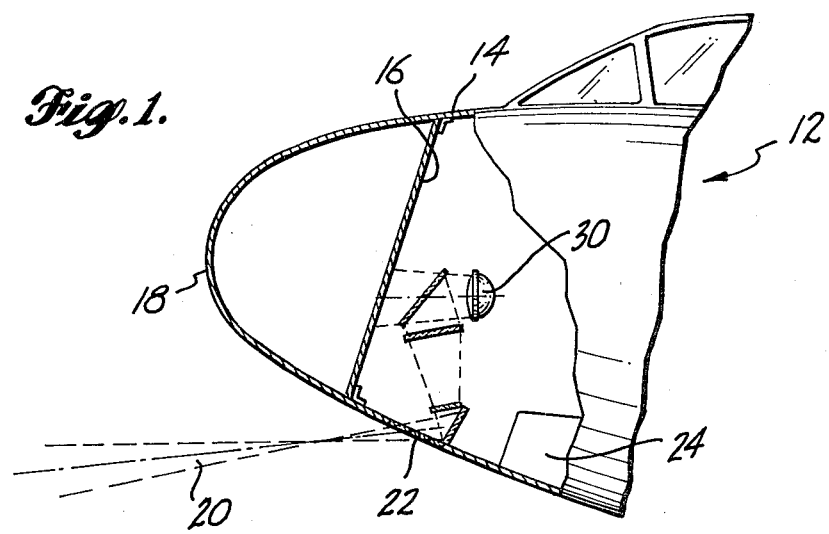
FIG. 1 is a schematic elevation view in partial section of the nose of an airplane showing the lighting system of the present invention mounted adjacent the nose.

Referring first to FIG. 1, the recessed lighting system 10 of the present invention is concealed within the body 12 of an airplane adjacent its nose 14. The airplane 12 is depicted as a commercial jetliner having a forward bulkhead 16 adjacent the nose 14, ahead of which is positioned a radome 18. Although not shown, radio and radar gear are positioned in the region located between the radome 18 and ahead of the bulkhead 16. As will be described in greater detail below, the lighting system 10 can be positioned so as to cause its exit beam 20 to pass through a small exit lens 22 and diverge into an illuminating beam for the purpose of lighting the runway and taxiway for the airplane. Although the lighting system of the present invention can be utilized in a variety of configurations and positions at different locations in the airplane the illustrated embodiment of the system is compactly sandwiched between the forward bulkhead 16 and the wheel well 24 adjacent the interior of the airplane skin 26, employing a minimum of space while providing an exit illumination beam tailored to the particular airplane on which it is being utilized.

Figure 2:
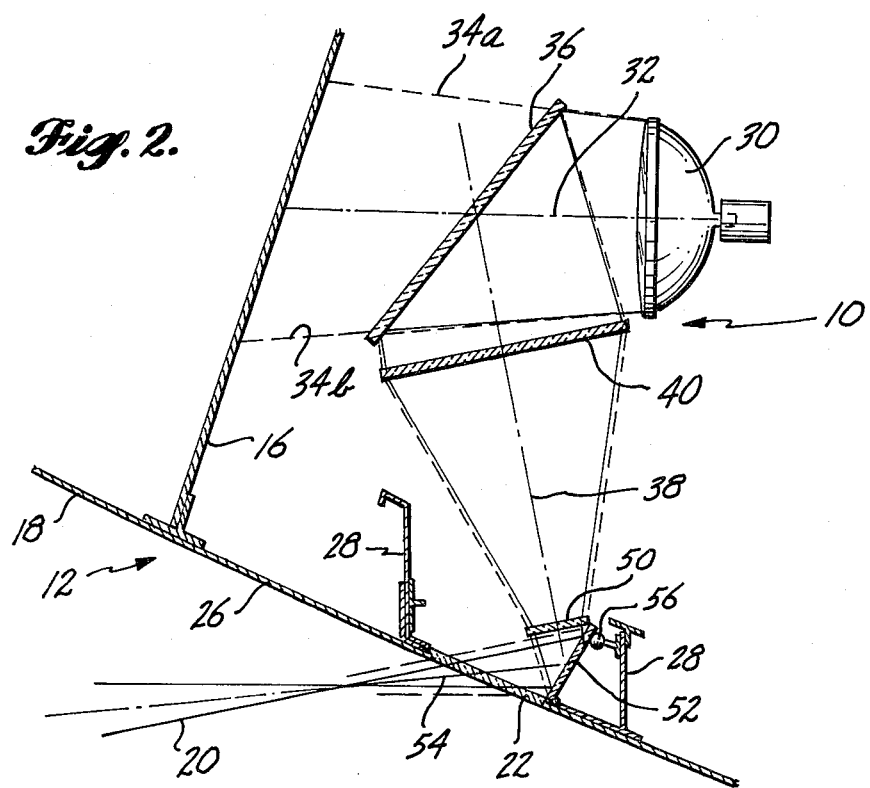
FIG. 2 is a greatly enlarged schematic view of the lighting system illustrated in FIG. 1.

Referring to FIG. 2, the exit lens 22 is mounted in a conventional manner between two reinforcing brackets 28 extending upwardly from the interior surface of the airplane skin 26. Because the exit lens is relatively small, no structural changes need be made to the airplane body to accommodate the exit lens 22 at this location. The exit lens 22, depending upon the particular application, can be composed of a synthetic transparent material, conventional glass, or under high heat load applications, a heat-tempered glass. The light source for the lighting system of the present invention can be a conventional lamp 30 having an internal diffusing or diverging reflector that emanates a light beam along a predetermined path indicated by centerline 32 and bounded by beam boundaries 34a and 34b. Lamp 30 is oriented generally horizontally so that the centerline of the light beam is directed toward the forward bulkhead 16. A frequency selective reflector 36 is positioned at an angle in the path of the light beam so as to divert in a downward and slightly rearward direction the visible portion of the spectrum emitted by the lamp 30. For example, the reflector 36 can be composed of a transparent material having what is referred to as a "cold mirror dielectric coating" thereon. The cold mirror dielectric coating material is commercially available and is transparent to the infrared portion of the spectrum while being reflective to the visible portion of the spectrum emitted by the lamp 30. Thus, the infrared radiation produced by the lamp passes through the light reflector 36 and impinges upon the bulkhead 16. Since the bulkhead is composed of metal, normally aluminum, it functions as a heat sink to quickly absorb and dissipate the heat generated by the lamp 30. Also, the reflector can be designed to pass to reflect other selected frequencies of the spectrum.

The visible portion of the spectrum is reflected by the reflector 36 downwardly and rearwardly along the path indicated by the dot-dash centerline 38 through a converging lens 40, a focusing lens 50, and impinges upon a directing mirror 52. The converging lens 40 is sized and positioned to reduce the width or diameter of the light beam to a dimension smaller than that of the original lamp diameter. The reduced-width light beam then passes through a focusing lens which refracts the light so as to decrease the convergency of the beam emanating from the converging lens. The directing mirror 52 intercepts the light beam focused by focusing lens 50 and is postioned so as to reflect the light beam through the exit lens 22 forwardly along a path external of the airplane 12 as indicated by exit beam centerline 54. If space, skin contours and other factors permit, it is not always necessary to employ the directing mirror 52 or focusing lens 50 with the system of the present invention.

If desired for this or other applications of the lighting systems, the directing mirror can be mounted on an adjustable hinge or universal mounting 56. By so mounting the mirror, its orientation can be adjusted so that the direction of the exit beam can be selectively altered. If desired for a particular application, a remotely controlled mirror positioning servomechanism could be employed in conjunction with the universal mounting so that the area illuminated by the exit beam could be remotely adjusted from, for example, the cockpit of the airplane.

The embodiment of the present invention achieves all of the objects set forth above. Particularly, a conventional light source can be utilized to produce a light beam which is caused to converge to a relatively small diameter so that it can be passed through an exit lens of minimum size. Additionally, the lighting system of the present invention occupies a relatively small volume so that relatively large and powerful lamps can be utilized, yet their output beam converged and passed through a relatively small exit lens. Positioning of the lighting system in the nose of an aircraft aft of the radome and forward of the wheel well allows advantage to be taken of existing access doors for lamp replacement and beam exit direction adjustment. In prior art lighting systems for example, many fasteners must be removed in order to remove the wing fairing to gain access to prior wing-mounted landing lights.

Although the present invention has been described in terms of a preferred embodiment, one of ordinary skill will readily understand that many variations, substitutions of equivalents, and other changes can be made without departing from the broad concepts displaced. For example, in its simplest form, light emanating from a single light source can be converged to a relatively small diameter or cross section and passed through an exit lens to illuminate a predetermined area. Other variations can include multiple light sources, whose light beams are converged to impinge upon one or more directing mirrors for diversion through a single exit lens. In addition to universally mounting a directing mirror for purposes of adjusting the area illuminated by the system, the directing mirror could also be moved along a predetermined path so as to cause a light beam, for example, to scan the leading edge of an airplane during flight for de-icing inspection purposes. The directing mirror can also be of a convex or concave shape to additionally serve the focusing function, thus eliminating the need for a focusing lens. Further, as an alternative to the converging lens, the lamp reflector itself can be designed to produce a converging beam. Also, instead of employing merely a flat glass exit lens, molded lenses of the fresnel type could be utilized to disperse a beam into a predetermined pattern outside the vehicle or aircraft, thus eliminating the need for a focusing lens. Accordingly, it is intended that the scope of protection granted by Letters Patent hereon be limited only by the definition contained in the appended claims and equivalents thereof.

We claim:

1. In an airplane including an exterior skin, an improved recessed lighting system comprising:
   lamp means for producing a light beam, said lamp means being located internally of and spaced from said skin,
   means operatively associated with said lamp means for causing said light beam to converge at a location adjacent said skin, said means being located internally of said skin,
   lens means transparent to said light beam being mounted in said skin, said lens means being positioned so as to intersect the path of said light beam and allow said beam to travel externally of said skin as an exit beam.

2. The lighting system of claim 1 further comprising:
   mirror means for reflecting said light beam located internally of said skin, said mirror means, being so positioned relative to said lamp means and said lens means as to bend said light beam emanating from said lamp means and cause said light beam to pass through said lens means.

3. The lighting system of claim 2 further comprising:
   means for hinging said mirror means to selectively alter the path of said exit beam.

4. The lighting system of claim 1 further comprising:
   focusing means interposed in said light beam for adjusting the spread of said exit beam.

5. The lighting system of claims 2 or 3 further comprising:
   focusing means interposed in said light beam for adjusting the spread of said exit beam.

6. The lighting system of claim 5 wherein said focusing means is interposed between said lens means and said mirror means.

7. The lighting system of claim 1 further comprising:
   means for removing selected frequencies from the spectrum emanating from said light beam located interior of said skin.

8. The lighting system of claim 7 wherein said selected frequencies are infrared radiation, and wherein said means for removing infrared radiation comprises a member interposed in the path of said light beam, said member being reflective with respect to infrared radiation and being transparent to visible light.

9. The lighting system of claim 8 wherein said member is oriented to reflect the infrared radiation toward a heat sink.

10. The lighting system of claim 9 wherein said lens means is located adjacent the nose of an airplane, said lamp means and said means for causing said light beam to converge being mounted adjacent a forward bulkhead in said aircraft, said bulkhead being said heat sink.

11. The lighting system of claim 1 wherein said means for causing said light beam to converge is a lens located in the path of said light beam.

12. The lighting system of claims 1, 2, 3, 4, 7, or 11 wherein said lens means is located adjacent the nose of an airplane, said lamp means and said means for causing said light beam to converge being adjacent a forward bulkhead in said aircraft.

13. The light system of claim 1 wherein said lamp means comprises a single lamp.

14. An improved lighting system for a vehicle having an exterior skin comprising:

lamp means for producing a light beam, said lamp means being located internally of and spaced from said skin, means operatively associated with said lamp means for causing said light beam to converge at a location adjacent said skin, said means being located internally of said skin, lens means transparent to said light beam being mounted in said skin, said lens means being positioned so as to intersect the path of said light beam and allow said beam to travel externally of said skin as an exit beam.

* * * * *